Figure 1:
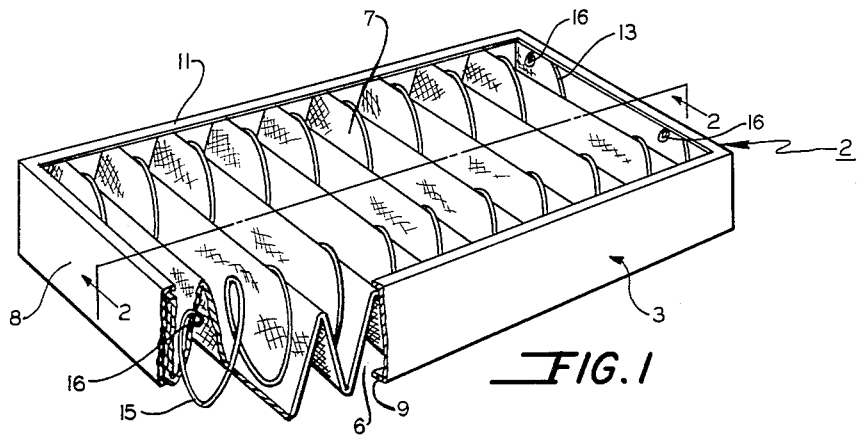

April 5, 1966      A. R. GETZIN      3,243,943

UNIT FILTER CONSTRUCTION

Filed June 15, 1964

*INVENTOR.*
ALLAN R. GETZIN

BY

Ralph C. Brieke
ATTORNEY

United States Patent Office 3,243,943
Patented Apr. 5, 1966

3,243,943
UNIT FILTER CONSTRUCTION
Allan R. Getzin, Jeffersontown, Ky., assignor to American Air Filter Company, Inc., Louisville, Ky., a corporation of Delaware
Filed June 15, 1964, Ser. No. 375,008
1 Claim. (Cl. 55—499)

The present invention relates to filter apparatus for removing contaminant particles from a fluid stream and more particularly to unit filter apparatus including filter medium disposed therein in pleated form across the fluid stream to be treated.

In accordance with the present invention, an economical and easy-to-assemble filter structure is provided which can be efficiently produced in mass quantities with a minimum of materials, the resulting filter structure providing a stable, effectively supported and spaced pleated filter medium which affords maximum filter area with minimum resistance to the fluid stream to be treated thereby. In addition, the present invention provides structure which serves to simultaneously support and space pleated filter medium in an open-ended support frame with minimum wear and tear and, at the same time, serves to maintain the ends of such filter medium in proper position against the inside walls of the open-ended frame. Further, the materials required for the inventive structure are sufficiently economical in nature to permit construction of a disposable-type unit filter, the spacer means and open-ended support frame being reclaimable for further use with new filter medium.

Various other features of the present invention will become obvious to one skilled in the art upon reading the description set forth hereinafter.

More particularly, the present invention provides a filter assembly for filtering contaminant particles from a fluid stream comprising: an open-ended frame; a filter medium disposed in the frame in pleated form across the fluid stream to be treated; and spacer means including an open helical coil having the turns thereof engaged in nesting fashion with the pleats of the filter medium to maintain the pleats in properly spaced relationship with respect to each other. In addition, the present invention provides a spacer means including an open helical coil sized relative its frame to hold the ends of the filter medium against the inside walls of the frame.

It is to be understood that various changes can be made in the arrangement, form and construction of the apparatus disclosed herein without departing from the scope or spirit of the present invention. In this connection, it is to be understood that, although the present invention finds particular adaptability with unit filters of a type utilized for treating gas streams, it can be readily employed with filters utilized for treating other types of fluids.

Figure 2:
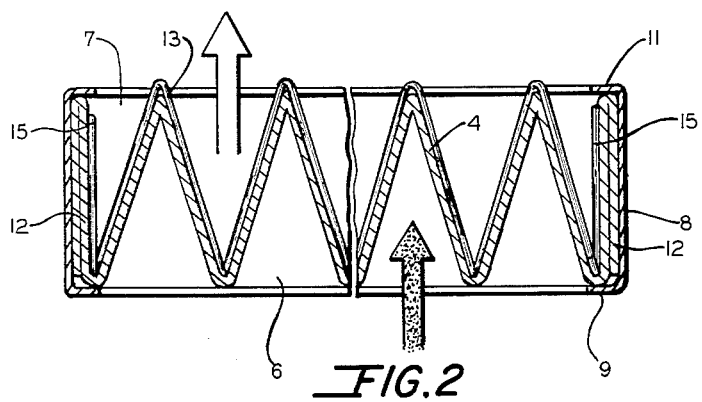

Referring to the drawings:

FIGURE 1 is a partially broken-away unit filter frame construction incorporating the features of the present invention; and FIGURE 2 is an enlarged, broken cross-sectional view taken in a plane passing through line 2—2 of FIGURE 1.

As can be seen in the drawing, inventive filter assembly 2 is disclosed as including open-ended filter medium support frame 3 having disposed therein in pleated fashion filter medium 4. Support frame 3, which is disclosed as rectangular in shape, can have other geometrical configurations, as the occasion warrants. Frame 3 serves to define the flow path for the fluid as it is treated and includes dirty fluid stream inlet 6 and clean fluid stream outlet 7. The frame is comprised of rectangular sidewalls 8 and rectangular border flanges 9 and 11 extending normally and inwardly from walls 8 along the upstream and downstream faces of the filter, respectively. It is to be understood that frame 3 can be made from any one of a number of suitable materials known in the art, and advantageously, can be made from disposable cardboard or chipboard.

Extending between sidewalls 8 of frame 3 in zig-zag, pleated fashion is aforementioned filter medium 4. This filter medium can be formed from any one of a number of known, suitable filtering materials and, advantageously, is of spun and bonded fiber glass with a scrim backing applied thereto along the downstream face. It is to be noted that the ends of filter medium 4 are folded over as at 12 to abut against the inside face of walls 8. It is to be understood that the double-fold arrangement can be eliminated if desired and only a single fold used.

To maintain the pleats of filter medium 4 in properly spaced relationship and to simultaneously support the sidewalls of such pleats along the downstream side thereof, a pair of open helical coil members 13 each having a circular cross section, is provided. Coil members 13 advantageously are resilient in nature and can be made from any one of a number of known materials, such as metal or plastic. It is to be noted that coils 13 are sized in length relative the length of filter frame 3 so that the ends 15 of the coils serve to bear against ends 12 of filter medium 4 to hold the same firmly against the inside faces of wall 8. It also is to be noted that ends 15 are provided with loops 16 to increase the bearing surface and insure rounded, non-tearing engagement with the filter medium.

As can be seen in the drawings, coils 13 are nested along the downstream side of pleated filter medium 4, successive turns of each of the coils nesting in successive pleats of the filter medium 4. In this connection, particular attention is directed to FIGURE 2, wherein it can be seen that substantially most of the body of each of the turns of each coil 13 extends along and in abutting relationship adjacent the sidewalls of the pleats to supportingly maintain such pleats in properly spaced relationship with minimum wear and tear.

It is to be understood that a suitable glue can be provided along ends 12 of filter medium 4 and along the edges thereof to seal the medium to the frame so as to avoid fluid stream bypass and inefficient filtering.

From the above description, it should be obvious to one skilled in the art that in a permanent type filter unit arrangement, it would be a simple matter to remove a used sheet of filter medium from a rigid, reclaimable support frame 3 along with reclaimable spacer coils 13. Fresh pleated filter medium could then be installed in frame 3 and coils 13 replaced to maintain the fresh medium in properly spaced and supported position.

The invention claimed is:

A filter assembly for filtering contaminant particles from a fluid stream comprising: an open-ended rectangular frame having inner side walls defining therebetween a path for said fluid stream to be treated, said frame including an upstream dirty fluid inlet and a downstream clean fluid outlet; a filter medium disposed in said frame in longitudinally-extending pleated form across the fluid stream to be treated with opposed edges of said filter medium abutting against said inner side walls of said frame in substantial line contact therewith and opposed ends of said medium folded to provide end folds of a breadth substantially equal to the breadth of said inner side walls of said frame to abut against said inner side walls in faced relationship therewith; and pleat spacer means longitudinally co-extensive with said pleated filter medium, said spacer means including resilient open helical coil means having successive turns engaged in nesting fashion with successive pleats of said filter medium along the downstream side thereof, substantially most of the body of said turns of said coil means extending in abutting relationship along the sides of said pleats to supportingly maintain said pleats in properly spaced relationship, said coil means being sized in length relative the length of said filter frame and having end turns with looped end portions, said end turns being of a breadth substantially equal to the breadth of said end folds of said filter medium to engage firmly against said end folds to hold the same against said inner side walls of said frame.

References Cited by the Examiner

UNITED STATES PATENTS

| | | | |
|---|---|---|---|
| 1,564,178 | 12/1925 | Orem | 55—504 X |
| 2,058,669 | 10/1936 | Dollinger | 55—521 X |
| 2,080,154 | 5/1937 | Strindberg | 55—500 |
| 2,479,722 | 8/1949 | Brixius | 55—499 |
| 2,766,983 | 10/1956 | Taylor | 267—1 |
| 2,907,408 | 10/1959 | Engle et al. | 210—493 X |
| 2,915,426 | 12/1959 | Poelman | 210—493 X |
| 2,988,227 | 6/1961 | Harms | 210—493 |

FOREIGN PATENTS

| | | |
|---|---|---|
| 781,883 | 3/1935 | France. |
| 977,538 | 11/1950 | France. |

ROBERT F. BURNETT, *Primary Examiner.*